M. B. & W. E. CLAYCOMB & J. A. WEIMER.
MUSIC CHART.
APPLICATION FILED JULY 2, 1917.
1,293,715.
Patented Feb. 11, 1919.
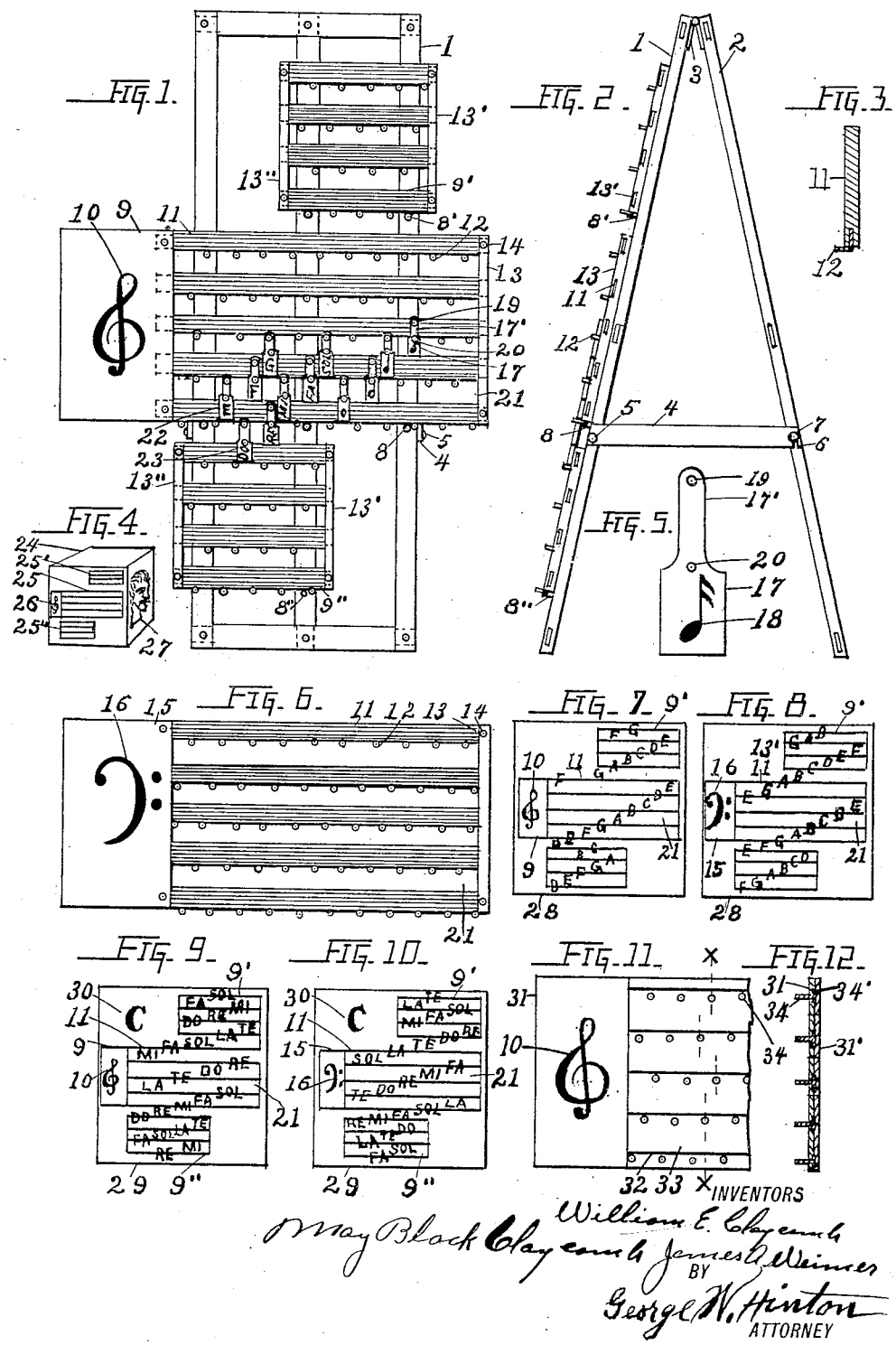

UNITED STATES PATENT OFFICE.

MAY BLACK CLAYCOMB, WILLIAM E. CLAYCOMB, AND JAMES A. WEIMER, OF NORTH KANSAS CITY, MISSOURI.

MUSIC-CHART.

1,293,715.　　　　Specification of Letters Patent.　　Patented Feb. 11, 1919.

Application filed July 2, 1917.　Serial No. 178,298.

*To all whom it may concern:*

Be it known that we, MAY BLACK CLAYCOMB, WILLIAM E. CLAYCOMB, and JAMES A. WEIMER, citizens of the United States, residing at North Kansas City, in the county of Clay and State of Missouri, have invented certain new and useful Improvements in Music-Charts, of which the following is a specification, reference being had therein to the accompanying drawing.

Our invention relates to improvements in toy music instructors, and the objects of our improvements are to provide an instructor of this class, by the use of which, children shall be interested, entertained and instructed in the learning of music by note, letter and word. Further objects are, to so construct and arrange the parts of a toy music instructor, that they shall be neat in appearance when in use, and can be easily and quickly placed in convenient positions for the pupil. Still further objects are, to so construct the parts, that they can be packed in the minimum amount of space, and be comparatively cheap in cost of manufacture.

We attain these objects by the devices illustrated in the accompanying drawings, in which:—

Figure 1 is a front view of the easel and of the parts supported thereon. Fig. 2 is a side view of the parts seen in Fig. 1. Fig. 3 is an enlarged transverse section, in detail, of one of the lines of the staff seen in Fig. 1. Fig. 4 is a view, in perspective, of one of the copy blocks. Fig. 5 is a front view of one of the pendants, in detail. Fig. 6 is a front view of a bass staff. Fig. 7 is an enlarged front view of one of the copy blocks, showing thereon, the letters which indicate the positions of the treble notes. Fig. 8 is a similar view of the indications of the bass notes. Fig. 9 is a similar view, showing the positions of the syllables, which indicate the treble sounds, in the scale of C. Fig. 10 is a view similar to Fig. 9, showing the positions of the syllables, which indicate the bass sounds, in the scale of C. Fig. 11 is a front view of one of the various forms in which the treble staff may be constructed. Fig. 12 is a transverse section, in detail, on the line X X, seen in Fig. 11, looking toward the left.

Referring to Figs. 1 and 2, the upper edge of easel 1, is connected with the upper ends of legs 2, by hinges 3, but one of which is shown. The spread of said legs is limited by hook bars 4, the front ends of which, are pivotally connected with said easel by pivots 5. The rear ends of said bars have hooks 6 formed thereon, but one of which is shown. Said hooks engage studs 7, which are secured in the sides of legs 2. Easel 1 has studs 8, 8' and 8" secured in the front surface thereof; on which the treble staff lines 11, with their connected parts, the upper leger lines 9' and the lower leger lines 9" are respectively supported.

The treble clef board 9 has the treble clef character 10 formed thereon.

The lines of said staff and said leger lines are preferably formed of wooden slats, each one of which is provided with a plurality of note studs 12, the upper end portions of which are screwed into the lower edges of said slats, as seen in Fig. 3. The lower end portions of said studs project beyond the front surfaces of said slats and are adapted to have pendants suspended therefrom, as hereinafter described.

Referring to Figs. 1 and 2, the right ends of the slat-formed lines 11, are tenon-and-mortise - connected with the preferably wooden end piece 13, while their left ends are similarly connected with the treble clef board 9.

The corner ones of said connections are detachably secured together by the removable pins 14. The slats forming leger lines 9' and 9" are similarly connected with their preferably wooden end pieces 13' and 13" respectively.

Said corner connections are detachable for permitting ready separation of the described parts, and packing of the same in the minimum amount of space.

The upper portions of all of the note studs 12 are finely screw threaded for adapting their lower portions to be rotated from the position seen in Fig. 3 to a position in alinement with, and beneath their respective lines.

Clef board 15 (see Fig. 5,) has clef 16 formed thereon and is connected with staff lines 11 and an end piece 13 in the same manner as the previously described treble staff lines, seen in Fig. 1; the whole forming a bass staff, which is adapted to be similarly supported on studs 8, and which can be separated for packing as previously described.

Pendants 17, of which one is shown in detail, in Fig. 5, are all of the same form and proportions. Said pendants are provided with the various characters of music, formed respectively thereon, on both sides thereof. Said characters of which one is shown in Fig. 5, designate notes, letters and syllables, respectively, as hereinafter described.

Pendant 17 has note 18 formed thereon, and has neck portion 17' formed therewith, through which latter the upper aperture 19, and the lower aperture 20 are formed. Said apertures are so positioned in said neck portion 17', that aperture 19 is passed over a stud 12 for suspending said pendant 17 over a line 11, as seen in Fig. 1. Aperture 20 is passed over one of said studs for suspending one of said pendants over a space 21, between any two of said lines. Said pendants are in like manner suspended over leger lines 9' and 9" and the undesignated spaces therebetween.

A plurality of pendants 22, are provided, on which the note-designating letters, A, B, C, etc., to the full end of the octave are formed, all of which are not shown. A plurality of pendants 23, are provided, on which the tone-designating syllables, DO, RE, MI, etc., to the full end of the octave are formed, all of which are not shown.

Referring to Fig. 4, block 24 is made in the form of a cube, preferably of wood or other material, that is light of weight.

Said block is one of a plurality of similarly formed blocks, and has the staff lines 25, and the leger-lines 25' and 25", formed thereon, on one of the faces thereof. Said staff lines are provided with the treble clef 26. The opposite face of block 24 (not shown,) is similarly provided with staff and leger lines and with a bass clef 16. Said block is used in teaching a pupil the forms of the clefs. The other faces of said block 24 have pictures 27, formed thereon.

Referring to Fig. 7, the obverse side of block 28 has the staff lines 11, and the leger-lines 9' and 9", formed thereon, with spaces 21 between them. Treble clef 10 is also formed on the face of said block. Said lines and spaces are marked with the letters, A, B, C, etc., for use as copy from which to determine the positions in which the lettered pendants 22 should be suspended over the treble staff lines and spaces seen in Fig. 1.

The reverse side of block 28 has the described staff and leger lines and spaces formed thereon with the bass clef 16. Said lines and spaces are marked with letters A, B, C, etc., for showing the proper positions in which the similarly marked pendants 22 should be placed on the bass staff, seen in Fig. 6.

Referring to Figs. 9 and 10, the obverse and reverse sides of block 29 have the previously described staff and leger lines and the treble and bass clefs, and the key note 30 formed respectively thereon. Said lines and the spaces therebetween, have the syllables DO, RE, MI, etc., formed thereon, for showing the proper positions in which the similarly marked pendants 23 should be placed on the treble and bass staffs, seen in Figs. 1 and 2, respectively, for indicating the treble and bass tones in the key of C.

It will be understood that other blocks are made for indicating the proper positions of the syllables in other keys.

In the use of our invention, with the parts in the positions shown in Figs. 1, 7 and 9; the user places blocks 28 and 29 in such positions as are convenient for the pupil, which is usually a child. Said pupil then picks up one of the pendants which may be either a pendant 17, 22 or 23, and places the same in the desired position, on staff 9, as shown to be the proper place, by referring to the block 28, or the block 29, as desired.

It will be understood that said pupil may refer to any piece of sheet music (not shown,) written in the key of C, in placing the note bearing pendants 17 and that the corresponding letter and syllable designations of said notes may also be placed on staff 9. Said pupil in studying the position and sounds of bass notes, removes staff 9 from easel 1 and places staff 15 thereon, after which said pupil refers to the reverse side of block 29, seen in Fig. 10, and may also refer to the bass staff of the same piece of sheet music in placing the note bearing pendants 17. Said pupil may also refer to the reverse side of block 28, seen in Fig. 8, and place the letter bearing pendants 22 on staff 15.

It will be understood, that the picking up and properly placing of the variously marked pendants, provides occupation for the hands, eyes and mind of the pupil, thereby providing work, which is interesting, entertaining and instructive, in the teaching of music by note, letter and sound-indicating syllables.

While we have shown and described block 29 as a copy block used in teaching music in the scale of C, the unshown and previously mentioned copy blocks, are used for teaching music in all of the various keys in which music is written.

While we have shown and described the staff lines 11 as being made of wooden slats, provided with pendant studs 12 connected therewith, for suspending pendants over said lines and also over the spaces therebetween; it is evident that studs properly positioned for performing the same functions could be connected with staff lines formed in various ways and of other material, without departing from the spirit of our invention, which we reserve the right to do.

A portion of one of such other forms of staffs is shown in Figs. 11 and 12, in which the front 31 of the staff is formed of pasteboard. Said front has a clef 10 and staff lines 32 formed thereon, with spaces 33 between the latter. Studs 34 have heads 34' formed on their inner ends. Said studs are passed through front 31 with their heads tightly pressed against the back surface of said front. Said heads are held in place by the back 31', which is preferably made of strong paper. Said back is glued or otherwise secured on the back surface of front 31.

Since said leger lines are of the same form and proportions as the leger-lines 9' and 9'', and since their structural details are the same as are shown in Fig. 12; said other form of leger-lines is neither shown nor described.

Having fully described our invention, what we claim as new and desire to secure by Letters Patent, is:—

1. A music chart comprising staff lines formed of slats; connecting means wherewith the ends of said slats are connected with spaces between said slats; a plurality of studs connected with said slats said studs being so positioned that pendants are suspended therefrom over said lines and spaces; a pendant having a music-indicating character formed thereon and an upper and a lower aperture formed through the upper portion thereof, said apertures being so positioned that the upper one is used for suspending said pendant from one of said studs with said pendant in position over the staff line that is next below said stud and the lower aperture is used for suspending said pendant in position over the space that is between said line and stud.

2. A music chart comprising, a clef board; staff-lines formed of slats; a plurality of L-shaped studs oscillatably secured in the lower edges of said slats; an end piece; tenon and mortise connections whereby one of the ends of each one of said slats is connected with said end piece with spaces between said slats; similar other connections whereby the other ends of said slats are similarly connected with said clef board; and pins passed through the corner ones of said connections whereby said parts are detachably secured together.

3. A music chart comprising, staff lines formed of slats; connecting means whereby the ends of said slats are connected with spaces between said slats; a plurality of L-shaped studs having their upper end portions oscillatably secured in the lower edges of said slats, the lower end portions of said studs extending beyond the front surfaces of said slats at right angles thereto, said lower end portions being adapted to be oscillated from their described position to a position in alinement with said slats for protection of said studs in packing and for reducing the space occupied by said studs and slats.

4. In a music chart, staff lines with spaces therebetween; studs connected with said staff lines projecting beyond the front surfaces of said lines at right angles thereto for supporting pendants thereon while said staff lines are supported in an inclined position; and supporting means on which said staff lines are supported in said position.

In testimony whereof we affix our signatures in the presence of two witnesses.

MAY BLACK CLAYCOMB.
WILLIAM E. CLAYCOMB.
JAMES A. WEIMER.

Witnesses:
NONA M. GIBSON,
A. H. TELGEMEIER.